(12) United States Patent
Howell

(10) Patent No.: US 9,057,838 B2
(45) Date of Patent: Jun. 16, 2015

(54) APPARATUS AND METHODS FOR THE DETERMINATION OF A BIREFRINGENCE AXIS OF A POLARIZATION-MAINTAINING OPTICAL FIBER

(75) Inventor: Timothy J. Howell, Newton Abbot (GB)

(73) Assignee: Vytran, LLC, Morganville, NJ (US)

( * ) Notice: Subject to any disclaimer, the term of this patent is extended or adjusted under 35 U.S.C. 154(b) by 451 days.

(21) Appl. No.: 13/533,514

(22) Filed: Jun. 26, 2012

(65) Prior Publication Data

US 2012/0328252 A1    Dec. 27, 2012

Related U.S. Application Data

(60) Provisional application No. 61/501,556, filed on Jun. 27, 2011.

(51) Int. Cl.
*G06K 9/00* (2006.01)
*G02B 6/255* (2006.01)
*G02B 6/024* (2006.01)

(52) U.S. Cl.
CPC .............. *G02B 6/2555* (2013.01); *G02B 6/024* (2013.01)

(58) Field of Classification Search
None
See application file for complete search history.

(56) References Cited

U.S. PATENT DOCUMENTS

| | | | |
|---|---|---|---|
| 4,474,469 A | 10/1984 | Abe | |
| 4,480,897 A * | 11/1984 | Okamoto et al. | 385/11 |
| 5,011,259 A | 4/1991 | Lieber et al. | |
| 5,013,345 A | 5/1991 | Itoh et al. | |
| 5,147,434 A | 9/1992 | Itoh et al. | |
| 5,149,350 A | 9/1992 | Itoh et al. | |
| 5,156,663 A | 10/1992 | Itoh et al. | |
| 5,179,419 A | 1/1993 | Palmquist et al. | |
| 5,488,683 A | 1/1996 | Michal et al. | |
| 5,572,313 A | 11/1996 | Zheng et al. | |
| 5,576,832 A | 11/1996 | Yamamoto | |
| 5,611,015 A | 3/1997 | Tokumaru et al. | |
| 5,758,000 A | 5/1998 | Zheng | |
| 5,850,283 A | 12/1998 | Zheng | |
| 5,995,212 A | 11/1999 | Dar et al. | |

(Continued)

FOREIGN PATENT DOCUMENTS

WO    WO 2010/039951 A1    4/2010

OTHER PUBLICATIONS

Fisher et al., Hough Transform, Image Processing Learning Resources, 2004, 13 pages, [retrieved on Aug. 23, 2012], [Retrieved from the internet:<URL: http://homepages.inf.ed.ac.uk/rbf/HIPR2/hipr_top.htm].

(Continued)

*Primary Examiner* — Vikkram Bali
(74) *Attorney, Agent, or Firm* — Cooley LLP

(57) ABSTRACT

In some embodiments, a non-transitory processor-readable medium storing code includes code to cause a processor to receive an image signal associated with an image of an end face of a polarization-maintaining optical fiber (PM fiber), determine a center position of the PM fiber, perform a local image equalization on the end face, and define an edge map of the end face. The code can perform a Hough space analysis on the edge map to determine the center position of a first structure and/or a second structure on the end face. The first structure and the second structure can each define at least in part a birefringence of the PM fiber. A birefringence axis of the PM fiber can be calculated based on at least two of the center position of the PM fiber, the center position of the first structure and the center position of the second structure.

8 Claims, 15 Drawing Sheets

(56) References Cited

U.S. PATENT DOCUMENTS

| | | | |
|---|---|---|---|
| 6,203,214 B1 | 3/2001 | Wesson | |
| 6,702,481 B2 | 3/2004 | Oki et al. | |
| 6,738,549 B2 | 5/2004 | Inaba et al. | |
| 6,952,007 B2 | 10/2005 | Kubo et al. | |
| 6,984,077 B2 | 1/2006 | Bush et al. | |
| 7,003,200 B2 | 2/2006 | Huang et al. | |
| 2005/0083033 A1* | 4/2005 | Kurosawa et al. | 324/96 |
| 2005/0219512 A1 | 10/2005 | Froggatt et al. | |
| 2005/0254754 A1 | 11/2005 | Huang et al. | |
| 2007/0230788 A1 | 10/2007 | Lei | |
| 2010/0008634 A1* | 1/2010 | Guertin et al. | 385/126 |
| 2010/0209049 A1 | 8/2010 | Zheng et al. | |
| 2011/0064366 A1 | 3/2011 | Zheng et al. | |

OTHER PUBLICATIONS

International Search Report and Written Opinion for International Patent Application No. PCT/US2012/044179, mailed on Oct. 1, 2012, 11 pages.

Zheng, W. et al., "Interrelation Profile Analysis Method for Alignment of Polarization-Maintaining Fiber," OFC/NFOEC 2010, paper JThA61 (2010), 3 pages.

News Release; "Revolutionary specialty fiber fusion splicer first in company's "ARCMaster™" product line;" [retrieved from the internet as early as Apr. 4, 2011], Retrieved from the Internet: <URL: http://www.fujikura.co.uk/fibre_optics/newsdesk/20100810_ARCMaster.html>, 2 pages.

Fujikura Product literature; "Specialty Fiber Fusion Splicers ARCMaster™ FSM-100 series," dated at least as early as Apr. 4, 2011, 4 pages.

* cited by examiner

APPARATUS AND METHODS FOR THE DETERMINATION OF A BIREFRINGENCE AXIS OF A POLARIZATION-MAINTAINING OPTICAL FIBER

CROSS-REFERENCE TO RELATED APPLICATIONS

This application claims priority to U.S. Provisional Application No. 61/501,556 filed Jun. 27, 2011, and entitled "Apparatus and Methods for the Determination of a Birefringence Axis of a Polarization Maintaining Optical Fiber," the disclosure of which is hereby incorporated herein by reference in its entirety.

BACKGROUND

Some embodiments described herein relate generally to methods and apparatus for determining a birefringence axis of a polarization-maintaining optical fiber.

Some known techniques for determining a birefringence axis in a polarization-maintaining optical fiber can be classified into one of two types of techniques: a side viewing technique and an end viewing technique. A side viewing technique can include, for example, illuminating and imaging through the side of the fiber and/or analyzing an output image to infer internal fiber structure. In general, this type of technique can have limited accuracy in determining the birefringence axis and the core position of the fiber because this type of technique does not directly measure the fiber's internal structure. End viewing techniques can also have a number of drawbacks. For example, an end view technique can be sensitive to end face artifacts, can be difficult to find features in the end face due to poor contrast and lack of dynamic range in the imaging sensor, and/or can often involve user input regarding position and/or size of birefringence axis defining features. In some cases, a user may not know these parameters or may input erroneous parameters, compromising system performance. Thus, a need exists for improved devices and methods for determining a birefringence axis of a polarization-maintaining optical fiber.

SUMMARY

In some embodiments, a non-transitory processor-readable medium storing code representing instructions to be executed by a processor includes code to cause a processor to receive an image signal associated with an image of an end face of a polarization-maintaining optical fiber (PM fiber). The non-transitory processor-readable medium also includes code to cause the processor to determine a center position of the PM fiber, perform a local image equalization on the end face of the PM fiber, and define an edge map of the end face of the PM fiber. The non-transitory processor-readable medium also includes code to perform a Hough space analysis on the edge map of the end face of the PM fiber to determine at least one of the center position of a first structure on the end face of the PM fiber and a center position of a second structure on the end face of the PM fiber. The first structure and the second structure can each define at least in part a birefringence of the PM fiber. The processor further includes code to calculate a birefringence axis of the PM fiber based on at least two of the center position of the PM fiber, the center position of the first structure and the center position of the second structure.

DETAILED DESCRIPTION

Figure 1A:
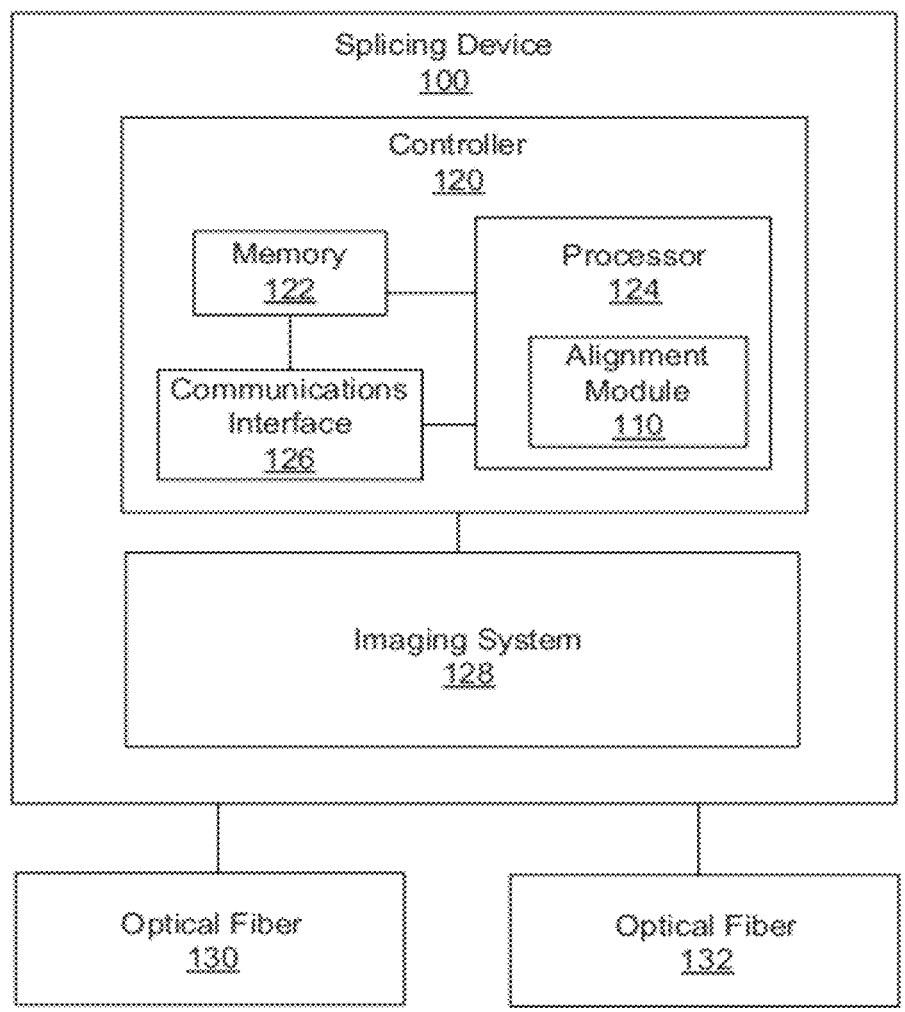
FIG. 1A is a schematic illustration of a fiber splicing device, according to an embodiment.

Apparatus and methods are described herein for determining a birefringence axis of an optical fiber and aligning the birefringence axes of two optical fibers to be spliced together. In some embodiments, a method of determining a birefringence axis in a polarization-maintaining optical fiber and a fiber splicing apparatus are provided. In some embodiments, an accurate determination of a birefringence axis in a polarization-maintaining optical fiber can be achieved even in the presence of common image defects.

In some embodiments, a method of determining a birefringence axis in a polarization preserving fiber includes, imaging the end face of a fiber with an imaging device, determining the fiber center position and radius, and executing a local image equalization on the fiber end face. During equalization care should be taken to minimize or avoid equalizing a portion or portions of the background image. In addition, in some situations, local image equalization may exclude an area near the fiber perimeter. The method of determining a birefringence axis in a polarization preserving fiber can also include, constructing an edge map of the fiber end face by scanning the end face horizontally and vertically on the fiber end face image; performing a Hough space analysis on the edge map to determine the approximate position and size of internal fiber features; determining feature edges by interpolating raw pixel data in the vicinity of feature edges estimated by the Hough space analysis; calculating a best fit curve to the feature edges identified in the Hough space analysis; and computing the birefringence axis based on the best fit position of at least one internal fiber features. In some embodiments, a fiber splicing apparatus can accurately align a birefringence axis of two fibers using the method described above and splice the two fibers together.

In some embodiments, a birefringence axis of an optical fiber can be determined to an accuracy within, for example, +/−0.05 degrees, without prior knowledge of the fiber parameters, and in the presence of various common image defects and limitations, if present. In some embodiments, fiber splices can be provided with low insertion loss and high polarization extinction ratio.

In some embodiments, an apparatus and method as described herein can, for example, handle fibers such as, for example, double clad fibers where the end view illumination is typically poor or inconsistent; improve the splicing system's ability to reject noise and cleave artifacts; improve the accuracy of birefringence axis measurement; eliminate entirely or at least alleviate the need for accurate user supplied values of the fiber parameters; and/or handle a partially occluded fiber where a small proportion of the fiber is not visible.

As background, radial asymmetry in the internal features of an optical fiber may cause it to be polarization-maintaining or equivalently polarization-preserving. The radial asymmetry may define a birefringence axis. Light launched into the fiber with a polarization state parallel to the birefringence axis can retain this polarization state as the light propagates down the fiber. Maintaining a defined polarization state within the fiber can be useful in many applications. Many types of polarization-maintaining fibers are manufactured by a variety of different vendors, including, for example, a polarization-maintaining fiber with fiber features including a core and two circular stress members that is manufactured by Fujikura America Inc., of Santa Clara, Calif. Such a fiber may be referred to as a PANDA fiber. Another example is a polarization-maintaining fiber with a core and bow-tie shaped stress members that is available from, for example, Fibercore Limited of Southampton, United Kingdom. In another example, a polarization-maintaining fiber includes an elliptical core and is available from, for example, IVG Fiber Limited, Woodbridge, Ontario, Canada. In yet another example, a polarization maintaining fiber can include a core and holes or photonic crystals. Such a fiber is available from, for example, NKT Photonics A/S Birkenrød, Denmark. Other types of polarization-maintaining fibers may be available from other vendors. All of the above-mentioned example fiber types have some radial asymmetry in their internal structure, which can help to define the birefringence axis of the fiber.

FIG. 1A is a schematic illustration of a fiber splicing apparatus, according to an embodiment. A fiber splicing apparatus 100 can include a system controller 120 and an imaging system 128. The system controller 120 can include a processor 124, a memory 122 and communications interface 126, and the processor 124 includes a fiber alignment module 110. The fiber splicing apparatus 100 can also include movable stages (not shown in FIG. 1A) on which optical fibers can be mounting during a splicing procedure. The fiber splicing apparatus 100 can also include a mirror (not shown in FIG. 1A) that can be used in conjunction with the imaging system 128 to image an end face of an optical fiber 130 and an end face of an optical fiber 132 to be spliced together, as described in more detail below. The imaging system 128 can include an imaging sensor or device, such as, for example, a charge-coupled device (CCD), or similar sensor with hardware and/or software (e.g., a second processor and a second memory, each not shown in FIG. 1A) to capture and analyze the intensity of each pixel in the sensing array. For example, the hardware and/or software associated with an image sensor device can relate to sampling (e.g., receiving an output) and/or modifying signals output from the sensor device, for example, post sampling processing, equalization, etc. The mirror can allow the end faces of both the optical fiber 130 and the optical fiber 132 to be imaged by moving a position of the imaging system 128 relative to the optical fibers 130 and 132. The imaging system 128 can have magnification that enables individual pixel sizes in the range of, for example, 0.2 to 1 micron, or other suitable pixel sizes.

The system controller 120 (also referred to herein as "controller") can receive from the imaging system 128 an image(s) of an end face of the first optical fiber 130 and an image(s) of an end face of the second optical fiber 132. The first optical fiber 130 and the second optical fiber 132 can each be, for example, polarization-maintaining optical fibers. The controller 120 can determine a birefringence axis of the first optical fiber 130 based on the image(s) of the end face of the first optical fiber 130 and a birefringence axis of the second optical fiber 132 based on the image(s) of the end face of the second optical fiber 132. The optical fiber splicing device 100 can then rotationally align the birefringence axis of the first optical fiber 130 and the birefringence axis of the second optical fiber 132, and perform a splicing procedure to splice together the first optical fiber 130 and the second optical fiber 132.

The controller 120 can include a combination of hardware modules and/or software modules (e.g., stored in memory and/or executing in a processor). Processor 124 can be operatively coupled to memory 122 and communications interface 126. Communications interface 126 can be one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 122 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 124 can be any of a variety of processors. Such processors can be implemented, for example, as hardware modules such as embedded microprocessors, Application-Specific Integrated Circuits ("ASICs"), Programmable Logic Devices ("PLDs") and Field-Programmable Gate Array Devices ("FPGAs"). Some such processors can have multiple instruction executing units or cores. Such processors can also be implemented as one or more software modules (e.g., stored in memory and/or executing in a processor) in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 124 can support standard HTML, and software languages such as, for example, JavaScript, JavaScript Object Notation (JSON), Asynchronous JavaScript (AJAX).

In some embodiments, the processor 124 can be, for example, a single physical processor such as a general-purpose processor, an ASIC, a PLD, or a FPGA having a single processing core or a group of processing cores. Alternatively, the processor 124 can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In yet other alternatives, the processor 124 can be a group of distributed processors (e.g., computing devices with one or more physical processors) operatively coupled one to another via a separate communications network (not shown). Thus, the processor 124 can be a group of distributed processors in communication one with another via a separate communications network (not shown). In some embodiments, a processor can be a combination of such processors. For example, a processor can be a group of distributed computing devices, where each computing device includes a group of physical processors sharing a memory bus and each physical processor includes a group of processing cores.

As described above, the controller 120 can determine a birefringence axis of the first optical fiber 130 based on the image(s) of the end face of the first optical fiber 130 and a birefringence axis of the second optical fiber 132 based on the image(s) of the end face of the second optical fiber 132. Each birefringence axis can also be referred to as a principal axis, or a fast or slow axis. Specifically, the fiber alignment module 110 (also referred to as "alignment module") can be configured to execute a Hough space analysis on an edge map constructed within images of the end faces of the optical fibers 130 and 132. For example, the Hough space analysis can be part of a process to determine a center position and radius of each of the optical fibers 130 and 132. An image equalization can also be performed on the images of the end faces of the optical fibers 130 and 132 and an edge map can be constructed to identify edges of internal fiber features within the end face of each the optical fibers 130 and 132. The internal fiber features can include, for example, birefringence defining features or structures, which for a PANDA type fiber are two circular stress members.

Figure 1B:
FIG. 1B is an example image of an end face of an optical fiber prior to image equalization.
Figure 1C:
FIG. 1C is another example of an image of an end face of an optical fiber prior to image equalization.

For example, image equalization can be used to increase the global contrast in an image and can be especially useful to spread out the image intensities associated with the background and features of interest in an image, such that, for example, light grays tend to become even lighter and dark grays tend to become even darker. FIG. 1B is an example image of an end face of a PANDA type fiber. As shown in FIG. 1B, the region within the end face is gray in color and the region outside the end face of the fiber is black. A double clad fiber can also exhibit a bright (near white) ring around the edge of the cladding boundary as shown in the example image of FIG. 1C. The white ring and black background can otherwise prevent the image intensities associated with the image in the central fiber end face regions from spreading out. As a result, there may be very little contrast in the regions of interest containing the fiber core and birefringence-defining features or structures. The method of localized image equalization described below allows the contrast in these regions to be improved.

As described herein, a process of localized image equalization can be performed on the image(s) of the end faces of the optical fiber 130 and 132 to disregard pixels that will adversely affect the spreading of the intensity spectrum (i.e., near black background and near white outer ring if exhibited in the image) and equalize only the pixels within the fiber end face (i.e., within the cladding boundary of the fiber). In this way, better contrast enhancement of the artifacts, such as birefringence-defining features (e.g., stress members) within the end face can be achieved. Such local equalization can be performed by, for example, the imaging system 128, the processor 124, alignment module 110, or other module, sub-module or processor of the splicing apparatus 100. The basic approach of local image equalization is not limited to polarization-maintaining fibers, and can be used on other types of fiber geometries.

In an alternative method, a similar result can be achieved by using a histogram adjustment approach. In such an approach, the image intensity histogram is transformed in such a manner that most histogram stretching occurs around a particular range of intensity values, while the lowest and highest intensity values remain unchanged. The net effect is to enhance the contrast in the mid-intensity range in which we typically find features of interest.

Next, based at least in part on the edge maps, the fiber alignment module 110 can identify one or more birefringence-defining structures or features within the end face of the optical fiber 130 and one or more birefringence-defining structures or features within the end face of the optical fiber 132. For example, as part of a process of the fiber alignment module 110, a Hough space analysis can be performed on an edge map of the end face of the first optical fiber 130 and a Hough space analysis can be performed on an edge map of the end face of the second optical fiber 132 to determine a size (e.g., radius) and center position of the birefringence-defining structures within the optical fibers 130 and 132. For example, edges of internal birefringence-defining structures can be approximated. For a PANDA type fiber, the Hough space analysis can be based on matching the circular shape of the stress members. For other types of polarization-maintaining fibers, a Hough space analysis can be used with the analysis directed at the appropriate geometric shape of the structure that defines the birefringence axis.

Calculated edges of the birefringence-defining structures can then be detected by analyzing pixel data in the vicinity of the feature edges determined by the Hough space analysis. For example, a best fit curve to the detected feature edges (e.g., detected by the Hough space analysis) can be calculated by the fiber alignment module 110 to determine a position of the birefringence-defining structure within the fiber end face of the optical fibers 130 and 132. The Hough space analysis and other subsequent mathematical calculations of the fiber alignment module 110 can yield an acceptably accurate determination of a size and/or position of the birefringence-defining feature or structure even in the presence of the image defects. For example, the Hough space analysis can determine the stress member positions even when up to 40% (e.g., 5%, 10%, 15%, 20%, 25%, 30%, 35%) of the fiber end face image contains image artifacts. In some embodiments, the position and radius of the birefringence-defining structure or feature can be determined to sub-pixel accuracy.

Based on the identified position of the birefringence-defining features, the birefringence axis of the optical fibers 130 and 132 can then be calculated. The birefringence-defining features can be, for example, a circular stress member of a PANDA type fiber where the position of each birefringence-defining feature or structure is the center position of each stress member. The birefringence axis can be determined using one or two internal birefringence-defining features or structures. For example, if the position of two birefringence-defining features can be determined, the birefringence axis can be determined by fitting a line between the centers of the birefringence-defining features. The birefringence axis can also be determined by fitting a line between a center of the optical fiber (e.g., 130 or 132) and the position of the identified birefringence-defining feature of that optical fiber. Thus, the birefringence axis can be calculated based on at least two of (1) the center position of the optical fiber, (2) the center position of a first birefringence-defining structure, and (3) a center position of a second birefringence-defining structure. A more detailed description of the identification of internal fiber features and the determination of a birefringence axis are described below with reference to, for example, FIGS. 3-9.

After determining the birefringence axis, the alignment module 110 can optionally store the information associated with the determined birefringence axis in the memory 122 for use at a later time, or can send a signal associated with the birefringence axis to, for example, a separate processor (not shown in FIG. 1A) of the controller 120 configured to move the movable stages to rotate and align the optical fibers. In some embodiments, when the optical fibers (e.g., 130 and 132) are ready to be spliced, the processor 124 can retrieve the stored birefringence axis information from the memory 122.

Figure 2:
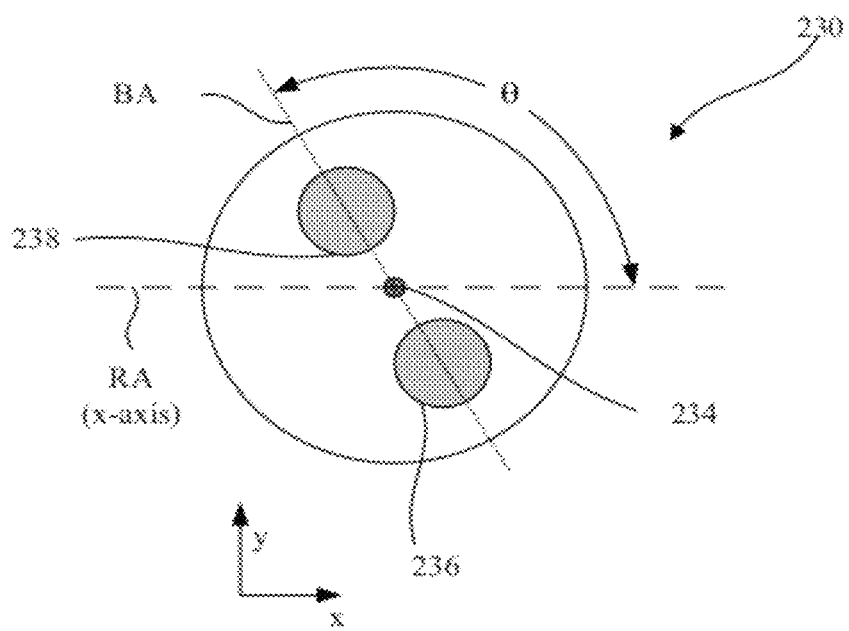
FIG. 2 is a schematic end view of an example polarization-maintaining fiber.

FIG. 2 is a schematic illustration of an end face of a PANDA type polarization-maintaining optical fiber 230 (also referred to herein as "optical fiber" or "fiber"). Although a PANDA type optical fiber is illustrated in this embodiment, it should be understood that the methods described herein can also be used to determine the birefringence axis of other types of optical fibers, such as other types of polarization-maintaining optical fibers. Internal fiber features of the optical fiber 230 can include, for example, two birefringence-defining structures, which can be, for example, circular stress members 236 and 238, disposed symmetrically about a fiber core 234, as shown in FIG. 2. Stress members 236 and 238 can apply stress to the fiber core 234. A birefringence axis BA is directed along the stress, which can be substantially parallel to the direction defined by a line running between a center of the stress member 236 and a center of the stress member 238 as shown in FIG. 2. As shown in FIG. 2, the birefringence axis BA may be at an angle θ relative to a designated reference axis RA, such as the horizontal or x-axis of an imaging system (not shown in FIG. 2). In practice, an image(s) of the end face of the optical fiber 230 may have poor contrast and include various defects and artifacts. For example, during preparation of the end face of the optical fiber 230 by cleaving, the end face of the optical fiber 230 may have hackle and mist, and/or chips may break-off from around a perimeter of the end face of the optical fiber 230. In another example, during preparation of an end face of the optical fiber 230 by polishing, scratch marks and chips, especially around a perimeter of the optical fiber 230 may be imported to the optical fiber 230. Such defects and artifacts may make it difficult to observe and detect the internal fiber features (e.g., birefringence-defining features or structures) that define the birefringence axis of the optical fiber 230. The limitations may be particularly acute in a double clad fiber, where the image may have limited contrast across the end face of the fiber. The splicing apparatus described herein (e.g., 100 described above) can be used to determine the birefringence axis of a fiber, such as the optical fiber 230, even with defects and artifacts present on the end face of the fiber.

Figure 3:
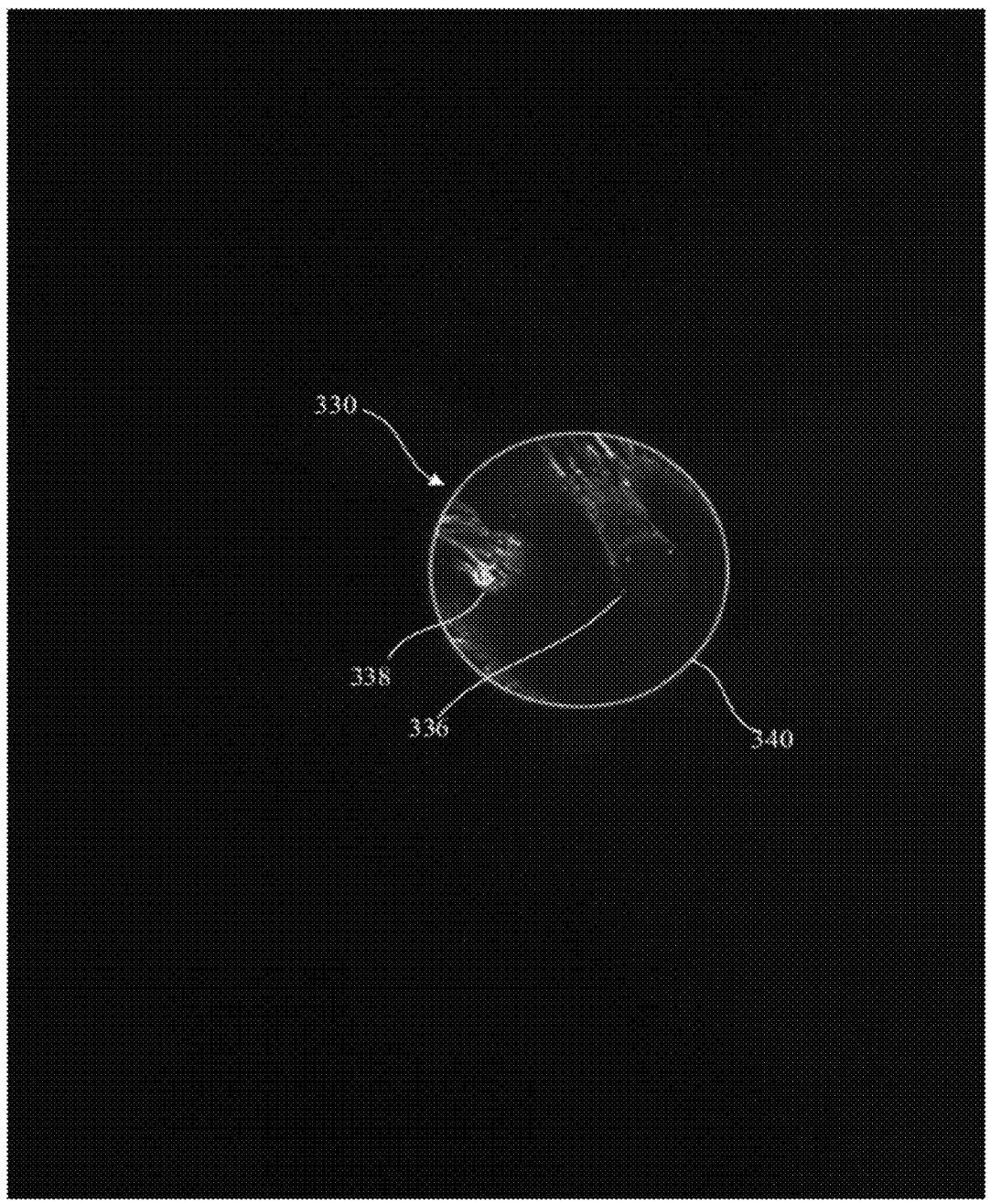
FIG. 3 is an image of an end face of a double clad PANDA fiber.
Figure 4:
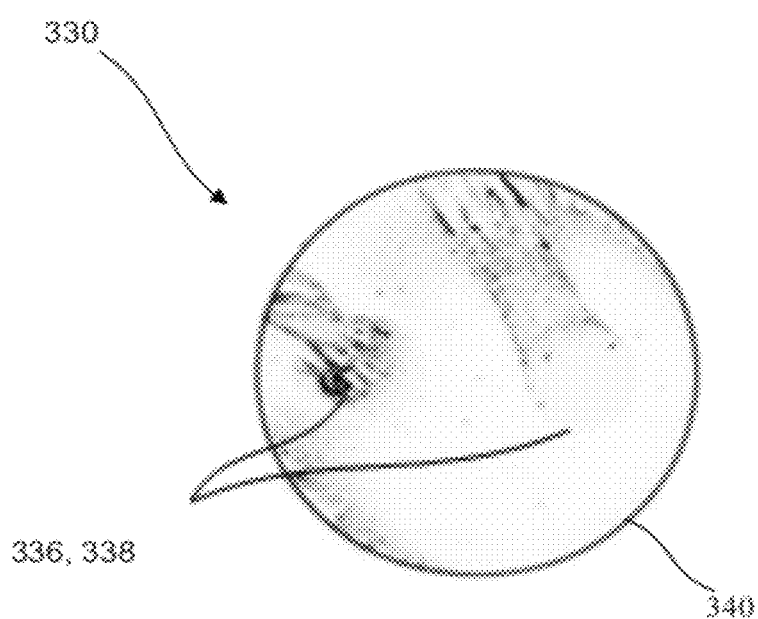
FIG. 4 illustrates the image of the end face of the double clad PANDA fiber of FIG. 3, shown in reverse contrast for clarity purposes (e.g., the bright outer ring in FIG. 3 is shown as a dark outer ring in FIG. 4).

FIGS. 3-8 illustrate images used in a determination of a birefringence axis of a double clad PANDA fiber, according to an embodiment. FIGS. 3 and 4 illustrate an image of an end face of a double clad PANDA fiber 330 (also referred to as an "optical fiber" or a "fiber"). In this example, the image of FIGS. 3 and 4 (FIG. 4 being a reverse contrast of the image of FIG. 3) was obtained with side illumination directed slightly toward the end face of the fiber 330, although other types of illumination geometries may alternatively be used. As shown in FIGS. 3 and 4, a circumference of the fiber 330 is visible as a bright ring 340. The bright ring 340 may correspond, for example, to an outer cladding in a double-clad fiber or the bright ring 340 may represent some other imaging artifact. Stress members 336 and 338 can be seen, but image artifacts extend from both stress members 336 and 338, which can make defining the precise location of the stress members 336 and 338 difficult. As described above, in some cases, such artifacts may arise from the cleaving operation that is used to prepare the fiber end face. The contrast in the image of FIGS. 3 and 4 can also prevent or limit the visibility of the core of the fiber 330. After obtaining the fiber end face image, a center position of the fiber 330 and a radius of the fiber 330 can be determined. In some embodiments, an edge map may be used in this determination as described below.

An edge map can be obtained by scanning the end face of the fiber horizontally and vertically over the entire image, and recording the points where the maximum change in intensity of the image occur. These points can correspond to a perimeter of the fiber. Once the top, bottom, left, and right sides of the fiber perimeter are identified in the edge map, the center position and radius of the fiber can be determined by the edge points. If two or more of the top, bottom, left, or right side of the fiber perimeter are obscured or missing in the image, alternative methods of determining the center position and radius of the fiber can be used. A Hough space analysis can be part of a process to determine the fiber center position and fiber radius. A user-supplied value of the fiber radius may be used to verify and check the empirically determined value. After determining the fiber center position and radius, a localized image equalization over the fiber end face can be performed.

Figure 5:
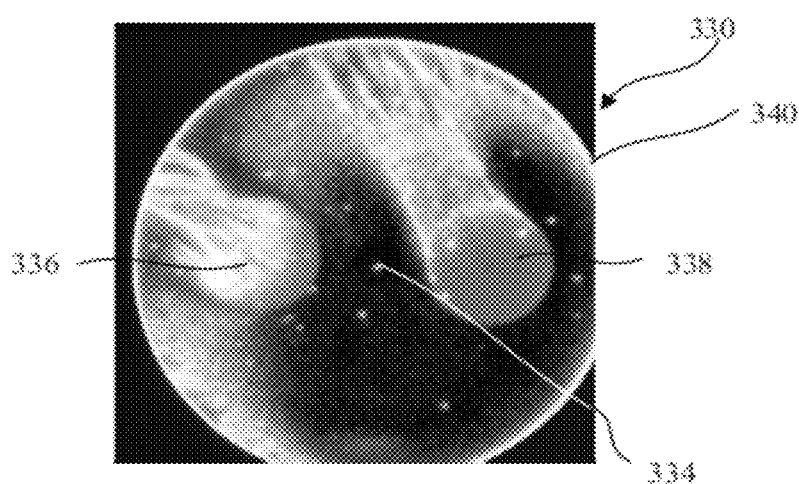
FIG. 5 is an enlarged image (8× magnified) of the end face of the double clad PANDA fiber of FIG. 3 with locally equalized image intensity.

Localized image equalization over the fiber end face may significantly improve contrast within the fiber end face allowing visualization of internal fiber features, including those that may define a birefringence axis. In this embodiment, only the end face of the fiber 330 or a portion of the end face is analyzed, and the contrast is maximized across the end face of the fiber 330. In some embodiments, during the image equalization, a ring shaped region just within a circumference of the fiber 330 may be excluded, as this may contain a bright ring 340, as shown in FIG. 3. If the ring 340 is included, the contrast may be reduced in the more central portions of the end face of the fiber 330 where the birefringence defining features (e.g., stress members 336 and 338) are situated. The resultant image is shown in FIG. 5, which is an 8× magnification of the image shown in FIGS. 3 and 4 with local image equalization. More generally, local image equalization may be used to exclude any bright areas in the fiber end face image allowing improved contrast over the remainder of the image.

As shown in FIG. 5, the fiber 330 is clearly visible against the black background of the image. The fiber stress members 336 and 338 are also clearly visible. A fiber core 334 of the fiber 330 is barely visible at a center of the fiber 330 (note darkened circular region). Various cleave artifacts, several originating in the stress members 336 and 338, are also visible. For other known techniques, these artifacts can often make difficult the determination of the exact location of the internal fiber features, including the birefringence-defining structures (e.g., the stress members 336 and 338) and the core 340. The apparatus and methods described herein can determine the birefringence axis of the fiber 330 even in the presence of these image defects.

After the localized image equalization over the fiber end face, an edge map on the fiber end face can be executed. An edge map of the fiber end face can be constructed by scanning the end face of the fiber horizontally and vertically and plotting the points where the maximum change in intensity occur. On each horizontal or vertical line, multiple edge points can be located. After constructing an edge map within the fiber end face, a Hough space analysis can be performed on the edge map to determine the approximate position and size of the internal fiber features. The internal fiber features can include the birefringence-defining features, which for a PANDA type fiber are the two circular stress members 336 and 338. For a PANDA type fiber, the Hough space analysis can be based on matching the circular shape of the stress members 336 and 338.

User-supplied values of, for example, a radius R1 of the fiber 330, a radius R2 of the stress member 336, a radius R3 of the stress member 338 and a distance D between the fiber center or core 334 and the stress member centers (each shown in the schematic illustration of FIG. 9), can be used to constrain the Hough space analysis within limits. It is not necessary to supply R1, R2, R3 and D, but doing so may speed up execution of the analysis. When these parameters are supplied, they can be used as an approximate indication of the size and separation between the stress members 336 and 338. If these values are initially zero, the alignment module can estimate suitable search ranges based on the measured fiber radius and can provide the actual measured values of R1, R2, R3 and D, back to the user. The results of the Hough space analysis can include, for example, approximate values of a center position and radius R1, R2 of the stress members 336 and 338, respectively. The Hough space analysis can also determine an approximate position and size of each internal fiber feature (e.g., stress members 336 and 338), even in the presence of image artifacts. The approximate values of the position and size of each birefringence-defining feature (e.g., stress members 336 and 338) as determined from the Hough space analysis can then be used to more accurately determine the position and size of each birefringence-defining feature (e.g., stress members 336 and 338) using a subsequent calculation(s).

Figure 6:
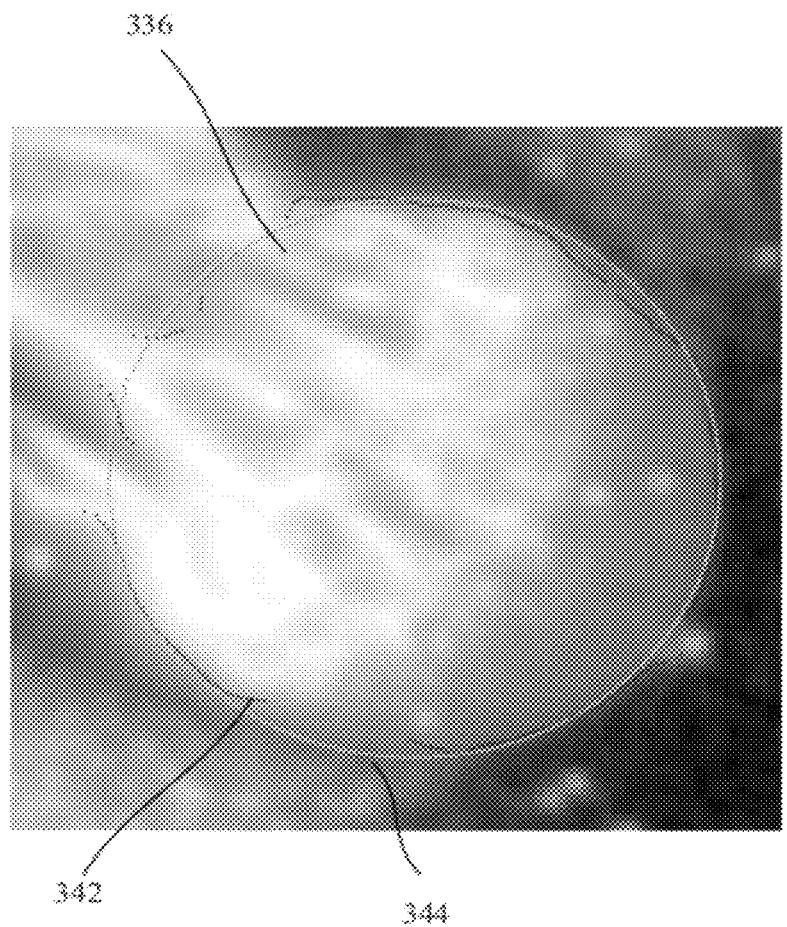
FIG. 6 is an enlarged view of a stress member of the double clad PANDA fiber of FIG. 5 showing detected stress member edge points and a calculated stress member edge showing a best fit circle to edge points.

In this example embodiment, the position and size of each birefringence-defining feature is the center position and radius of each stress member 336 and 338. The subsequent calculation(s) can detect feature edges by analyzing raw pixel data in the vicinity of the estimated feature edge determined from the Hough space analysis. By analyzing the pixels only in the vicinity of the previously-obtained approximate feature edges determined from the Hough space analysis, the alignment module can reject image artifacts that may be present in other areas of the image. The analysis can detect multiple points around the perimeter of the birefringence-defining features (e.g., stress embers 336 and 338) corresponding to a maximum rate of change in the image intensity. These detected points can correspond to the detected feature edges 342 as shown in FIG. 6, which is an expanded view of the stress member 336. The detected feature (e.g. stress member 336) edges 342 are denoted by black dots visible in FIG. 6. As is evident in FIG. 6, these detected feature edges 342 can vary significantly from the circumference of the stress member 336 due to imaging defects. In some areas, the detected points may be missing where the feature edge mapping procedure may have failed to detect an edge due to the image defects.

If for some of the multiple points around a perimeter of the stress member 336, a maximum rate of change in the image intensity is not detected, no detected feature edge 342 is recorded for that point. In some embodiments, the detected feature edges 342 may be determined with sub-pixel accuracy. It should be understood that other types of analysis can alternatively be used to detect the feature edges 342. These detected feature edges 342 can then be curve fit and each birefringence-defining feature (e.g., stress members 336 and 338) may be separately curve fit. For the case of a circular stress member (e.g., 336 and 338), the positions of the detected feature edges 342 can be fit to the circumference of a circle.

A variant of the process performed by the alignment module can include an iterative sequence of curve fitting, where the data is sorted by the distance between the positions of the detected feature edges 342 and the curve fit. The data points with the greatest deviation between the detected feature edges 342 and the curve fit can be discarded, and a best fit curve can be recalculated. The iterative sequence can proceed until the quality of the curve fit ceases to show appreciable improvement.

A calculated stress member edge 344 of the circumference of the stress member 336 as determined by the curve fitting process is denoted by the white dots in the image of FIG. 6. Hough space analysis and other subsequent calculations can yield an accurate determination of the birefringence-defining feature (e.g., stress member 336) size and position even in the presence of the image defects. For example, the Hough space analysis can accurately determine the stress member positions even when up to 40% of the fiber end face image contains image artifacts. In some embodiments, the position of the stress member center position and radius can be determined to sub-pixel accuracy.

The birefringence axis can then be calculated based on the identified position of the birefringence-defining features (e.g., stress members 336 and 338) as described above. As described above, the birefringence-defining features can be, for example, the circular stress members (e.g., 336 and 338) of the PANDA type fiber illustrated in this example embodiment. In this case, the position of each birefringence-defining feature is the center position of each stress member 336 and 338. In general, the position of two internal features can be used to determine the birefringence axis; however, an estimate of the birefringence axis may be determined using only a single birefringence-defining feature as described in more detail below.

Figure 7:
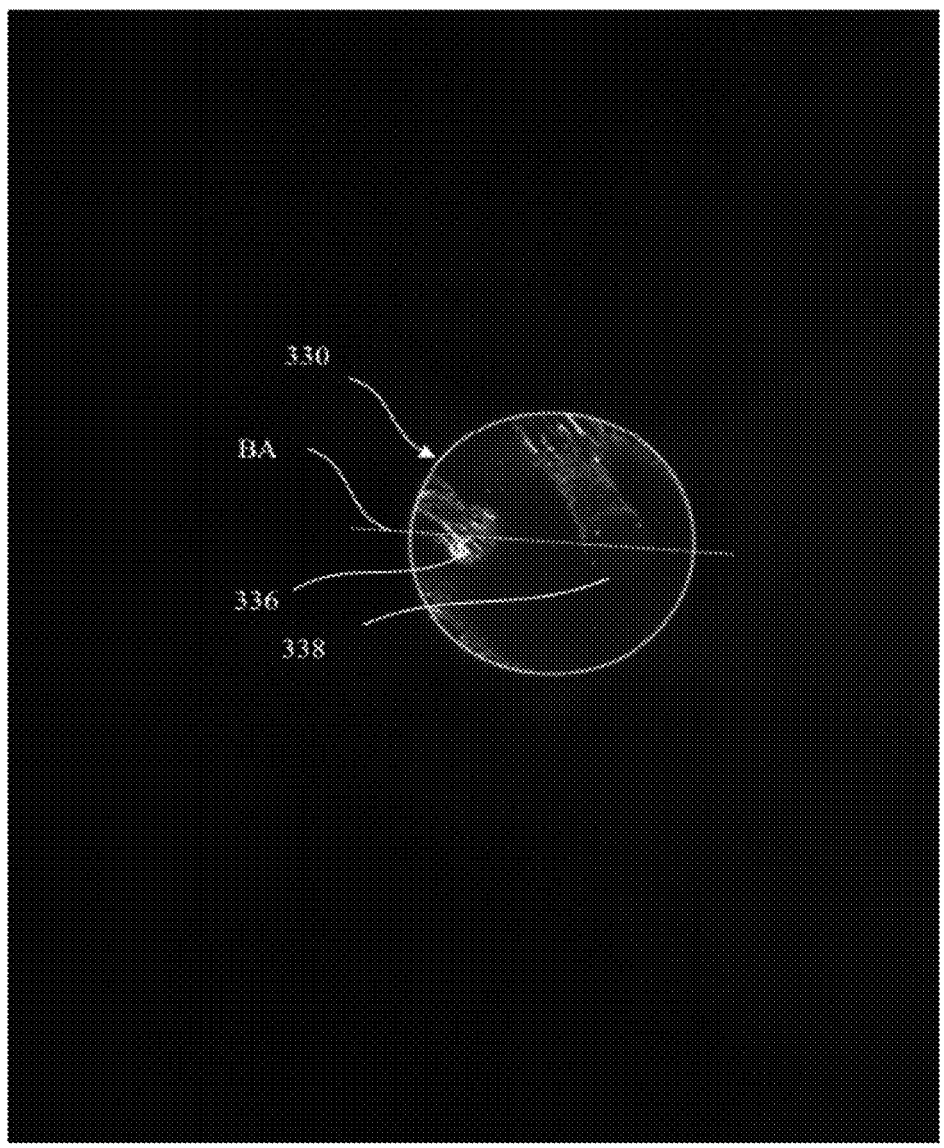
FIG. 7 is an image of an end face of the double clad PANDA fiber of FIG. 3 showing a birefringence axis, according to an embodiment.
Figure 8:
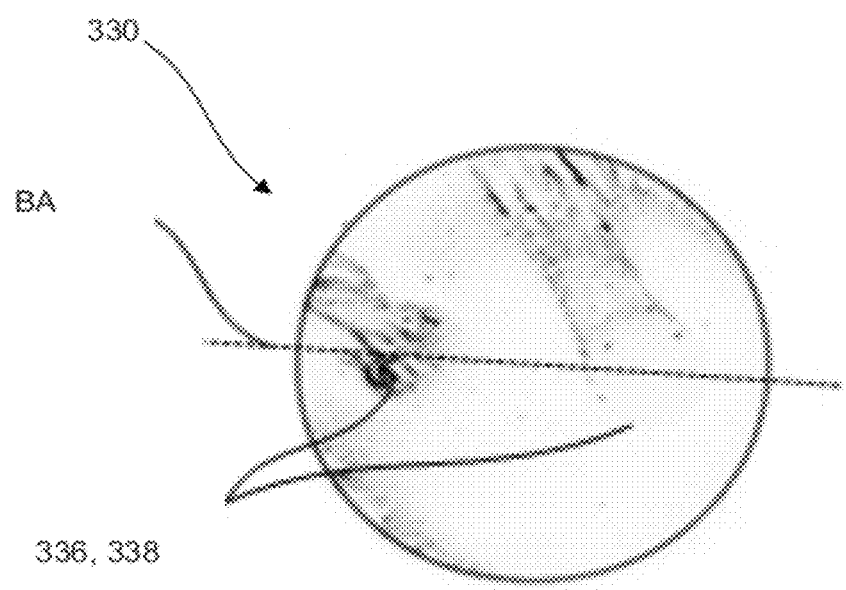
FIG. 8 is an illustration of the image of FIG. 7, shown in reverse contrast for clarity purposes.
Figure 9:
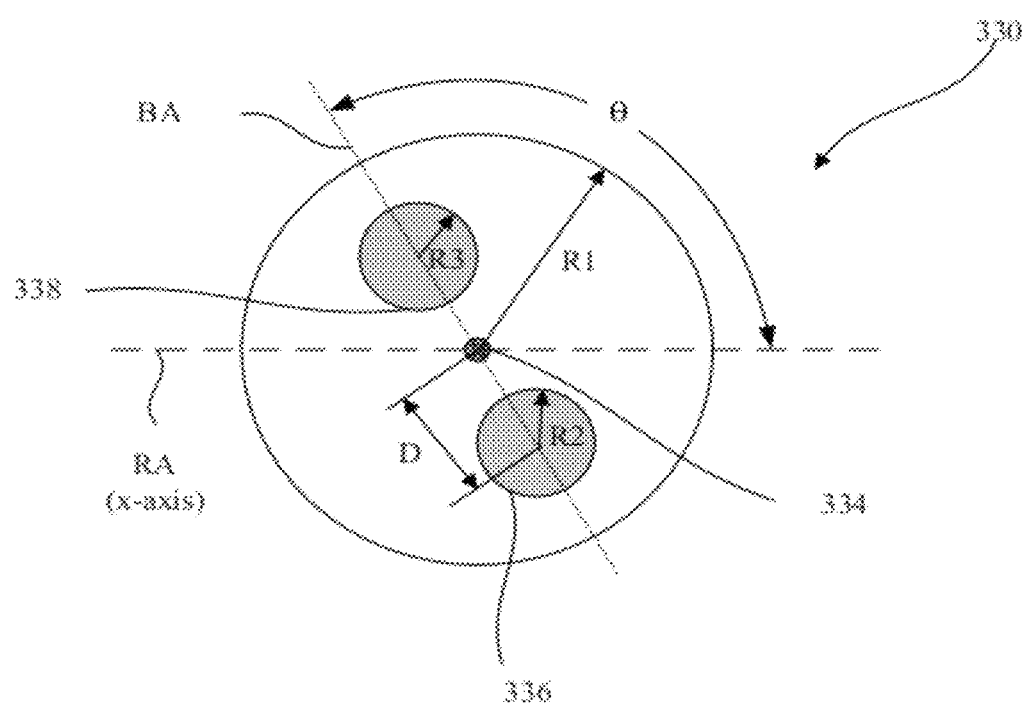
FIG. 9 is a schematic illustration of an end face of the polarization-maintaining fiber of FIG. 3.

If the position of two birefringence-defining features can be determined (e.g., stress members 336 and 338), the birefringence axis BA may be determined by fitting a line between the centers of the stress members 336 and 338. As shown in FIGS. 7 and 8, a birefringence axis BA of the fiber 330 can be determined by fitting a line between the centers of the stress members 336 and 338. If one of the birefringence-defining features (e.g., stress members 336 or 338) is obscured such that the Hough space analysis and subsequent calculation cannot determine its position, the birefringence axis BA can be determined by fitting a line between a center of the fiber 330 and the position of the identified birefringence defining feature (e.g., stress member 336 or 338). This analysis can be, for example, equivalent to assuming that the obscured birefringence-defining feature (e.g., the stress member) is located symmetrically about the fiber center with respect to the position of the identified birefringence defining feature (e.g., the stress member). Thus, the birefringence axis BA of the polarization-maintaining fiber 330 can be calculated based on at least two of (1) the center position of the polarization-maintaining fiber 330, (2) the center position of the first birefringence-defining structure (e.g., stress member 336), and (3) the center position of the second birefringence-defining structure (e.g., stress member 338).

Figure 10:
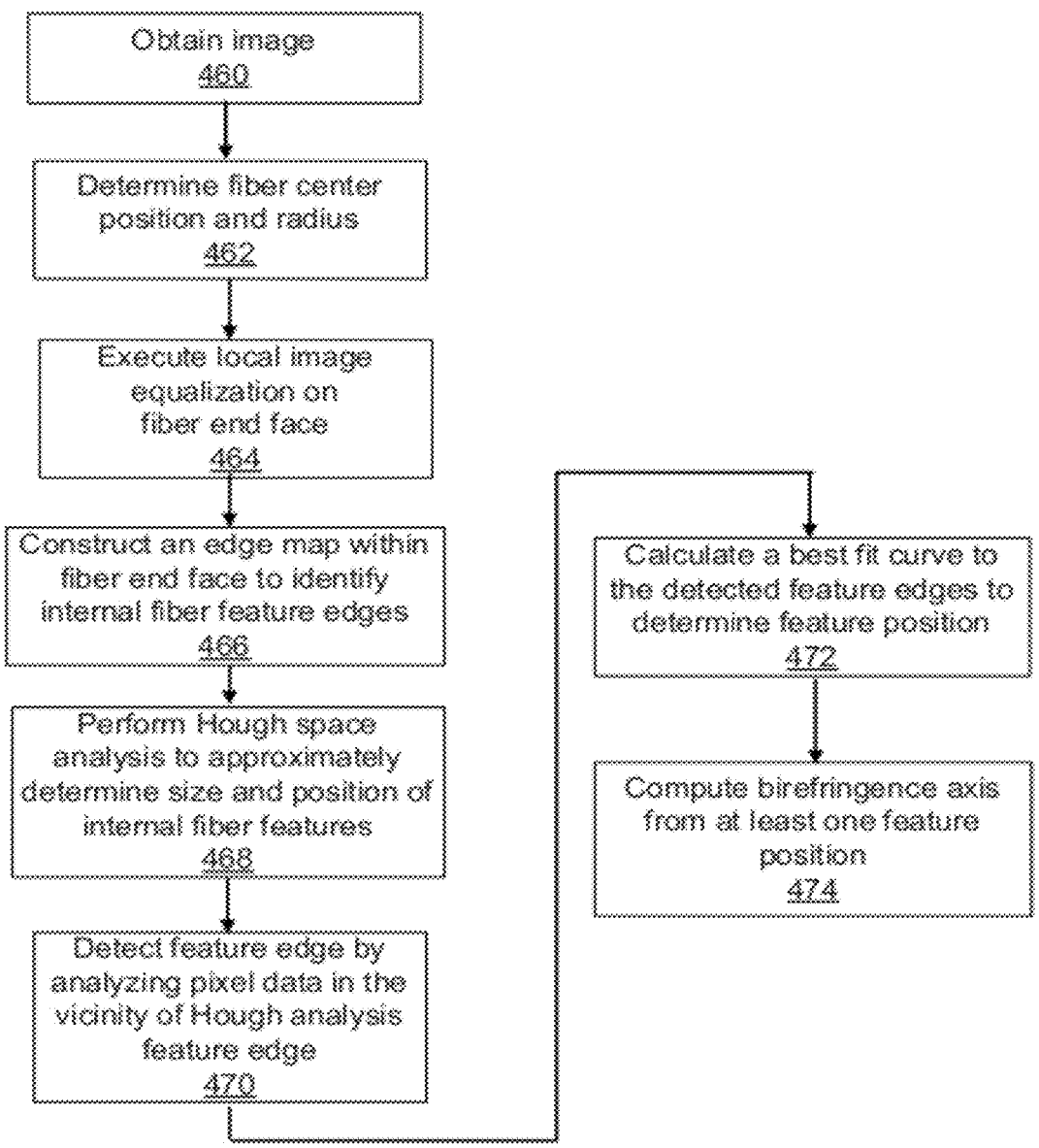
FIG. 10 is a flowchart illustrating a method of determining a birefringence axis of a polarization maintaining fiber, according to an embodiment.

FIG. 10 is a flowchart illustrating a method of determining a birefringence axis of a polarization-maintaining fiber, according to an embodiment. As shown in FIG. 10, the method can include at 460, imaging an end face of a polarization-maintaining fiber with an imaging sensor or device. At 462, a fiber center position and radius can be determined. At 464, a local image equalization on the fiber end face can be executed. During equalization, care can be taken minimize or avoid equalizing a portion or portions of the background image. In addition, in some case, an area near the fiber perimeter can be excluded. At 466, an edge map of the fiber end face can be constructed by scanning horizontally and vertically on the fiber end face image.

At 468, a Hough space analysis can be performed on the edge map to determine an approximate position and size of the internal fiber features (e.g., stress members). Feature edges can be detected at 470 by analyzing raw pixel data in the vicinity of feature edges estimated by the Hough space analysis. At 472, a best fit curve to the feature edges identified in the Hough space analysis can be calculated and the birefringence axis can be computed based on the best fit position of at least one internal fiber feature. For example, as described herein, the birefringence axis of the polarization-maintaining fiber can be calculated based on at least two of (1) the center position of the polarization-maintaining fiber, (2) the center position of a first birefringence-defining structure, and (3) the center position of a second birefringence defining structure of the fiber.

Figure 11:
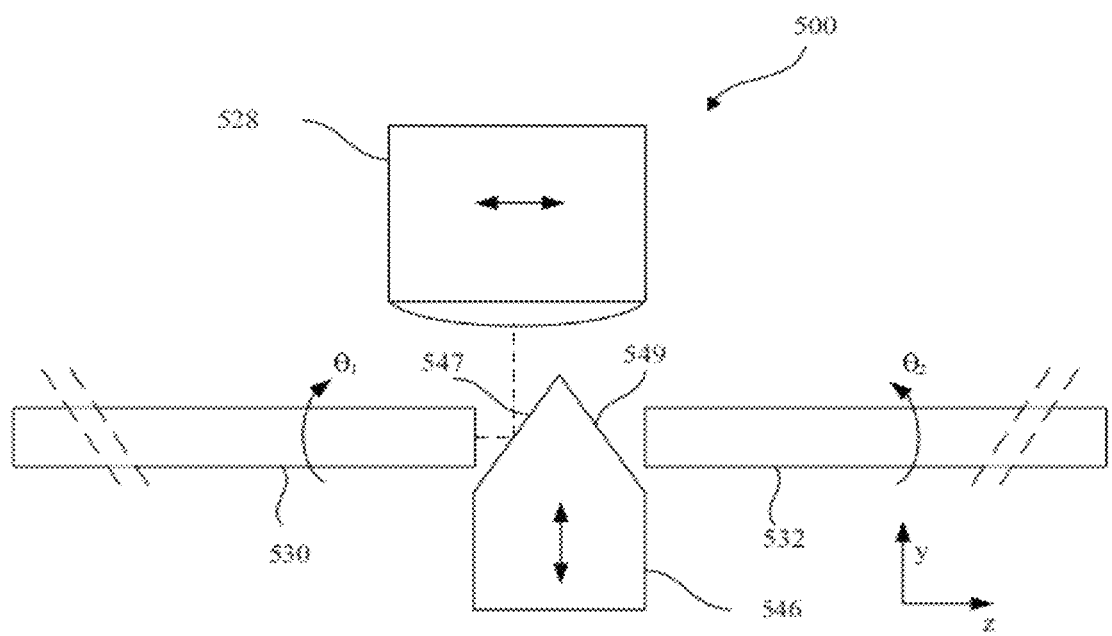
FIG. 11 is a side view of a fiber splicing apparatus, according to an embodiment.

The previously described method can be used to perform birefringence axis alignment, for example, in a fiber splicing apparatus. FIG. 11 is a schematic illustration of a fiber splicing apparatus, according to an embodiment. A fiber splicing apparatus 500 can be used to splice together a first optical fiber 530 and a second optical fiber 532, which can be mounted on moveable stages of the fiber splicing apparatus 500 (not shown in FIG. 11). The movable stages can allow both optical fiber 530 and optical fiber 532 to be moved in three orthogonal directions, x, y and z, and allow the optical fiber 530 and the optical fiber 532 to be rotated about the z-axis (e.g., the θ angular orientation of FIG. 2).

The fiber splicing apparatus 500 also includes a mirror 546 that has two reflective surfaces 547 and 549 each oriented at, for example, substantially 45° relative to the z-axis and that can be used to view the end face of the optical fiber 530 and the end face of the optical fiber 532, respectively, with an imaging system 528. For example, the reflective surfaces can allow the imaging system 528 to view the end face of the optical fiber 530 and the end face of the optical fiber 532 at a substantially perpendicular angle when reflected from the reflective surfaces 547 and 549, respectively. The imaging system 528 can include an imaging sensor or device, such as, for example, a charge-coupled device (CCD), or similar sensor with appropriate hardware and/or software (as described above with respect to FIG. 1A) to capture and analyze the intensity of each pixel in the sensing array. The mirror 546 can allow the end faces of both the optical fiber 530 and the optical fiber 532 to be imaged by moving the position of the imaging system 528 relative to the optical fibers 530 and 532. The imaging system 528 can have magnification that enables individual pixel sizes in the range of, for example, 0.2 to 1 micron, or other suitable pixel sizes.

Figure 12:
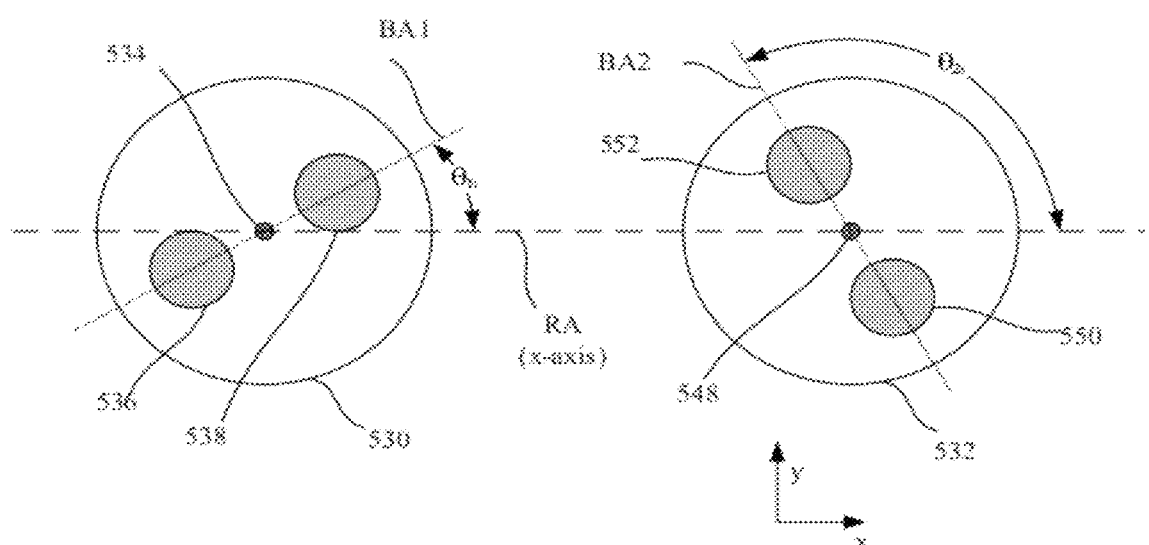
FIG. 12 is an end view of two polarization-maintaining fibers, according to an embodiment.

The optical fibers 530 and 532 can be, for example, polarization-maintaining fibers, as previously described. FIG. 12 illustrates a schematic view of the end faces of optical fiber 530 and optical fiber 532 viewed through the imaging system 528 of FIG. 11. In this embodiment, the optical fibers 530 and 532 each include two circular stress members (e.g., the fibers are PANDA fibers) to define the birefringence in the fiber core. It should be understood, however, that other types of fibers may alternatively be used. Specifically, the optical fiber 530 includes a fiber core 534, a first stress member 536 and a second stress member 538. The optical fiber 532 includes a fiber core 548, a first stress member 550 and a second stress member 552.

As previously described, light launched into the end faces of optical fibers having a polarization orientation parallel to the birefringence axis can maintain that polarization orientation or state as it propagates down the optical fiber (e.g., 530 and 532). Images of the optical fibers 530 and 532 can be taken, and a fiber alignment module (not shown) of the splicing device 500 can determine the birefringence axes of the two optical fibers 530 and 532, as described herein.

When splicing two polarization maintaining fibers (e.g., optical fiber 530 and optical fiber 532) together, it can be desirable that the polarization axes of each of the optical fibers (e.g., 530 and 532) be aligned parallel to each other. If the polarization axes of the two optical fibers are not aligned parallel, the polarization orientation can be lost as the light propagates through the splice. The closer the match (e.g., the alignment), the higher the ratio of correctly polarized light to non-polarized light (or PER—Polar Extinction Ratio) that can be achieved.

As shown in FIG. 12, when two polarization-maintaining fibers (e.g., optical fiber 530 and optical fiber 532) are inserted into the splicing apparatus 500, their birefringence axes may not be parallel. By way of example, the initial birefringence axis BA1 of optical fiber 530 is denoted as $\theta_{1i}$ and the initial birefringence axis BA2 of optical fiber 532 is denoted as $\theta_{2i}$. Here $\theta_{1i}$ is the angle between a reference axis RA and the birefringence axis BA1, and $\theta_{2i}$ is the angle between the reference axis RA and the birefringence axis BA2. In this example, the reference axis RA can be chosen parallel to the x-axis, which can correspond to a horizontal scan on the imaging sensor, it should be understood, however, that other reference directions may alternatively be used.

Figure 13:
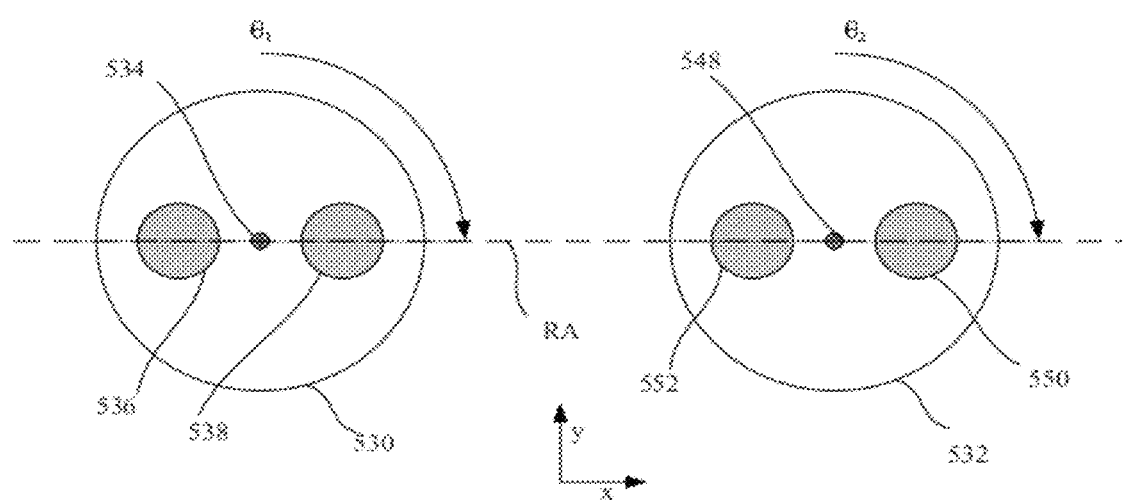
FIG. 13 is an end view of the two polarization-maintaining fibers of FIG. 12 with aligned birefringence axes.

As described above with reference to FIG. 1A, information associated with the birefringence axes BA1 and BA2 can be stored in a memory (not shown) of a controller (not shown in FIG. 11) of the splicing apparatus 500. Prior to splicing, the splicing apparatus 500 can rotate the optical fiber 530 and/or the optical fiber 532 such that the birefringence axis BA1 of optical fiber 530 and the birefringence axis BA2 of optical fiber 532 are aligned to be parallel to the reference axis RA and to each other, as shown in FIG. 13. Mathematically this can be represented as: $\theta_1=\theta_2=\theta$. After the optical fibers 530 and 532 have been positionally and rotationally aligned, they can be spliced together by any known means or methods.

In an alternative embodiment, for polarization-maintaining fibers with non-circular stress members, a Hough space analysis may be performed that is consistent with the shape of the stress member. For example, a bow-tie stress member may use a parametric fit with variables corresponding to the bow-tie shape. Similarly, for fibers with elliptical elements, a parametric fit with variables corresponding to the elliptical shape may be used. In such cases, a user can specify the basic type of polarization-maintaining fiber and the alignment module can determine the relevant Hough space parameters specific to that particular type of polarization-maintaining fiber.

The methods for determining a birefringence axis of an optical fiber described herein can be used on a single polarization fiber, which is a variant of a polarization maintaining fiber where one of the polarization states is not guided by the fiber. The methods described herein can also be used to align and splice other types of fibers which have radial asymmetric structures, such as, for example, chiral fibers. The methods described herein can also be used to find the position and size of internal features of fibers with a noncircular cross-section.

In some embodiments, a non-transitory processor-readable medium storing code representing instructions to be executed by a processor includes code to cause a processor to receive an image signal associated with an image of an end face of a polarization-maintaining optical fiber (PM fiber). The non-transitory processor-readable medium also includes code to cause the processor to determine a center position of the PM fiber, perform a local image equalization on the end face of the PM fiber, and define an edge map of the end face of the PM fiber. The code can also perform a Hough space analysis on the edge map of the end face of the PM fiber to determine at least one of the center position of a first structure on the end face of the PM fiber and a center position of a second structure on the end face of the PM fiber. The first structure and the second structure can each define at least in part a birefringence of the PM fiber. The processor further includes code to calculate a birefringence axis of the PM fiber based on at least two of the center position of the PM fiber, the center position of the first structure and the center position of the second structure.

In some embodiments, the code to cause the processor to define an edge map can include code to cause the processor to define the edge map of the end face of the PM fiber based on an image signal received associated with a horizontal scan of the end face of the PM fiber and an image signal received associated with a vertical scan of the end face of the PM fiber. In some embodiments, the non-transitory processor-readable medium described above can further include code to cause the processor to determine a top edge, a bottom edge, a left edge and a right edge of the end face of the PM fiber, and to define a circumference and a center position of the end face of the PM fiber based on the top edge, the bottom edge, the left edge and the right edge of the end face of the PM fiber. In some embodiments, the code to cause the processor to perform a local image equalization on the end face of the PM fiber can include code to cause the processor to perform local image equalization on substantially only the end face of the PM fiber excluding a ring shaped region just within a circumference of the end face of the PM fiber. In some embodiments, the first structure and the second structure described above are each one of a circular stress member, a bow-tie stress member, an elliptical core, and a photonic crystal structure. In some embodiments, the code to cause the processor to perform a Hough space analysis includes code to cause the processor to determine a radius of at least one of the first structure or the second structure and to determine a center position of the at least one of the first structure or the second structure, and the non-transitory processor-readable medium described above can further include code to cause the processor to determine a distance between the center position of the PM fiber and the center position of the at least one of the first structure or the second structure; and determine a distance between the center position of the PM fiber and the radius of the at least one of the first structure or the second structure.

In some embodiments, the non-transitory processor-readable medium described above can also include code that is configured to calculate the birefringence axis in the presence of image artifacts that obstruct up to 40% of the image associated with the end face of the PM fiber. In some embodiments, the PM fiber is a first PM fiber, and the non-transitory processor-readable medium can include code to cause the processor to receive an image signal associated with an image of an end face of a second polarization-maintaining optical fiber (second PM fiber); calculate a birefringence axis of the second PM fiber based on the image associated with the second PM fiber; and send an alignment signal to an optical fiber splicing device. In such an embodiment, the alignment signal can be configured to cause the optical fiber splicing device to rotationally align the birefringence axis of the first polarization-maintaining optical fiber and the birefringence axis of the second PM fiber. In some embodiments, the non-transitory processor-readable medium can include code to cause the processor to determine the center position of at least one birefringence-defining structure with sub-pixel accuracy.

In some embodiments, an apparatus includes an optical fiber splicing device that includes a controller and an imaging device. The controller is configured to receive from the imaging device an image of an end face of a first polarization-maintaining optical fiber and an image of an end face of a second polarization-maintaining optical fiber. The controller is configured to determine a birefringence axis of the first polarization-maintaining optical fiber based on the image of the end face of the first polarization-maintaining optical fiber and a birefringence axis of the second polarization-maintaining optical fiber based on the image of the end face of the second polarization-maintaining optical fiber. The controller is configured to perform a Hough space analysis on an edge map of the end face of the first polarization-maintaining optical fiber and a Hough space analysis on an edge map of the end face of the second polarization-maintaining optical fiber. The optical fiber splicing device is configured to rotationally align the birefringence axis of the first polarization-maintaining optical fiber and the birefringence axis of the second polarization-maintaining optical fiber.

In some embodiments, the optical fiber splicing device can be configured to rotationally align the birefringence axis of the first polarization-maintaining optical fiber in the presence of image artifacts that obstruct up to 40% of the image of the end face of the first polarization-maintaining optical fiber and the birefringence axis of the second polarization-maintaining optical fiber in the presence of image artifacts that obstruct up to 40% of the image of the end face of the second polarization-maintaining optical fiber. In some embodiments, the optical fiber splicing device can be configured to rotationally align the birefringence axis of the first polarization-maintaining optical fiber and the birefringence axis of the second polarization-maintaining optical fiber within 0.05 degrees. In some embodiments, the controller can be configured to perform local image equalization on substantially only the end face of the first polarization-maintaining optical fiber and the end face of the second polarization-maintaining optical fiber, excluding a ring shaped region just within a circumference of the first polarization-maintaining optical fiber and a circumference of the second polarization-maintaining optical fiber. In such an embodiment, the optical fiber splicing device can be configured to rotationally align the birefringence axis of the first polarization-maintaining optical fiber and the birefringence axis of the second polarization-maintaining optical fiber after the controller has performed local image equalization.

In some embodiments, a non-transitory processor-readable medium storing code representing instructions to be executed by a processor includes code to cause a processor to receive from an imaging device an image of an end face of a first polarization-maintaining optical fiber and an image of an end face of a second polarization-maintaining optical fiber. The code can also cause the processor to determine a birefringence axis of the first polarization-maintaining optical fiber based on the image of the end face of the first polarization-maintaining optical fiber and a birefringence axis of the second polarization-maintaining optical fiber based on the image of the end face of the second polarization-maintaining optical fiber. The code can also cause the processor to perform a Hough space analysis on an edge map of the end face of the first polarization-maintaining optical fiber and a Hough space analysis on an edge map of the end face of the second polarization-maintaining optical fiber, and send an alignment signal to an optical fiber splicing device. The alignment signal can be configured to cause an optical fiber splicing device to rotationally align the birefringence axis of the first polarization-maintaining optical fiber and the birefringence axis of the second polarization-maintaining optical fiber.

In some embodiments, a non-transitory processor-readable medium further includes code to cause the processor to determine the birefringence axis in the presence of image artifacts that obstruct up to 40% of the image of the end face of the first polarization-maintaining optical fiber and the image of end face of the second polarization-maintaining optical fiber. In some embodiments, the code to cause the processor to send an alignment signal includes code to cause the processor to send an alignment signal to the optical fiber splicing device to cause the optical fiber splicing device to rotationally align the birefringence axis of the first polarization-maintaining optical fiber and the birefringence axis of the second polarization-maintaining optical fiber within 0.05 degrees. In some embodiments, the non-transitory processor-readable medium further includes code to cause the processor to perform local image equalization on substantially only the end face of the first polarization-maintaining optical fiber and the end face of the second polarization-maintaining optical fiber, excluding a ring shaped region just within a circumference of the first polarization-maintaining optical fiber and a circumference of the second polarization-maintaining optical fiber. The code to cause the processor to send an alignment signal includes code to send an alignment signal configured to cause the optical splicing device to rotationally align the birefringence axis of the first polarization-maintaining optical fiber and the birefringence axis of the second polarization-maintaining optical fiber after the local image equalization has been performed. In some embodiments, the code to perform a Hough space analysis includes code to cause the processor to determine a center position of at least one structure on the end face of the first polarization-maintaining optical fiber and a radius of the at least one structure on the end face of the first polarization-maintaining optical fiber, the structure defining at least in part a birefringence of the first polarization-maintaining fiber.

Some embodiments described herein relate to a non-transitory computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of processor-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Other embodiments described herein relate to a computer program product, which can include, for example, the instructions and/or computer code discussed herein. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events can be modified. Additionally, certain of the events can be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:

an optical fiber splicing device including a controller and an imaging device, the controller configured to receive from the imaging device an image of an end face of a first polarization-maintaining optical fiber and an image of an end face of a second polarization-maintaining optical fiber, the controller configured to determine a birefringence axis of the first polarization-maintaining optical fiber based on the image of the end face of the first polarization-maintaining optical fiber and a birefringence axis of the second polarization-maintaining optical fiber based on the image of the end face of the second polarization-maintaining optical fiber, the controller configured to perform a Hough space analysis on an edge map of the end face of the first polarization-maintaining optical fiber and a Hough space analysis on an edge map of the end face of the second polarization-maintaining optical fiber, the optical fiber splicing device configured to rotationally align the birefringence axis of the first polarization-maintaining optical fiber and the birefringence axis of the second polarization-maintaining optical fiber, the controller configured to perform local image equalization on substantially only the end face of the first polarization-maintaining optical fiber and the end face of the second polarization-maintaining optical fiber, excluding a ring shaped region just within a circumference of the first polarization-maintaining optical fiber and a circumference of the second polarization-maintaining optical fiber, the optical fiber splicing device is configured to rotationally align the birefringence axis of the first polarization-maintaining optical fiber and the birefringence axis of the second polarization-maintaining optical fiber after the controller has performed local image equalization.

2. The apparatus of claim 1, wherein the optical fiber splicing device is configured to rotationally align the birefringence axis of the first polarization-maintaining optical fiber and the birefringence axis of the second polarization-maintaining optical fiber within 0.05 degrees.

3. An apparatus, comprising:
an optical fiber splicing device including a controller and an imaging device,
the controller configured to receive from the imaging device an image of an end face of a first polarization-maintaining optical fiber and an image of an end face of a second polarization-maintaining optical fiber,
the controller configured to determine a birefringence axis of the first polarization-maintaining optical fiber based on the image of the end face of the first polarization-maintaining optical fiber and a birefringence axis of the second polarization-maintaining optical fiber based on the image of the end face of the second polarization-maintaining optical fiber,
the controller configured to perform a Hough space analysis on an edge map of the end face of the first polarization-maintaining optical fiber and a Hough space analysis on an edge map of the end face of the second polarization-maintaining optical fiber,
the optical fiber splicing device being configured to rotationally align the birefringence axis of the first polarization-maintaining optical fiber in the presence of image artifacts that obstruct up to 40% of the image of the end face of the first polarization-maintaining optical fiber and the birefringence axis of the second polarization-maintaining optical fiber in the presence of image artifacts that obstruct up to 40% of the image of the end face of the second polarization-maintaining optical fiber.

4. The apparatus of claim 3, wherein:
the controller is configured to perform local image equalization on substantially only the end face of the first polarization-maintaining optical fiber and the end face of the second polarization-maintaining optical fiber, excluding a ring shaped region just within a circumference of the first polarization-maintaining optical fiber and a circumference of the second polarization-maintaining optical fiber,
the optical fiber splicing device is configured to rotationally align the birefringence axis of the first polarization-maintaining optical fiber and the birefringence axis of the second polarization-maintaining optical fiber after the controller has performed local image equalization.

5. The apparatus of claim 3, wherein the optical fiber splicing device is further configured to splice together the first polarization-maintaining optical fiber and the second polarization-maintaining optical fiber.

6. A non-transitory processor-readable medium storing code representing instructions to be executed by a processor, the code comprising code to cause a processor to:
receive from an imaging device an image of an end face of a first polarization-maintaining optical fiber and an image of an end face of a second polarization-maintaining optical fiber,
perform a Hough space analysis on an edge map of the end face of the first polarization-maintaining optical fiber and a Hough space analysis on an edge map of the end face of the second polarization-maintaining optical fiber;
determine a birefringence axis of the first polarization-maintaining optical fiber based on the image of the end face of the first polarization-maintaining optical fiber and a birefringence axis of the second polarization-maintaining optical fiber based on the image of the end face of the second polarization-maintaining optical fiber;
perform local image equalization on substantially only the end face of the first polarization-maintaining optical fiber and the end face of the second polarization-maintaining optical fiber, excluding a ring shaped region just within a circumference of the first polarization-maintaining optical fiber and a circumference of the second polarization-maintaining optical fiber; and
send, after the local image equalization has been performed, an alignment signal to an optical fiber splicing device, the alignment signal configured to cause an optical fiber splicing device to rotationally align the birefringence axis of the first polarization-maintaining optical fiber and the birefringence axis of the second polarization-maintaining optical fiber.

7. A non-transitory processor-readable medium of claim 6, further comprising code to cause the processor to:
determine the birefringence axis in the presence of image artifacts that obstruct up to 40% of the image of the end face of the first polarization-maintaining optical fiber and the image of end face of the second polarization-maintaining optical fiber.

8. The non-transitory processor-readable medium of claim 6, wherein the code to cause the processor to send an alignment signal includes code to cause the processor to:
send an alignment signal to the optical fiber splicing device to cause the optical fiber splicing device to rotationally align the birefringence axis of the first polarization-maintaining optical fiber and the birefringence axis of the second polarization-maintaining optical fiber within 0.05 degrees.

* * * * *